United States Patent
Shenbagam et al.

(10) Patent No.: US 12,287,702 B2
(45) Date of Patent: Apr. 29, 2025

(54) FAULT MANAGEMENT IN A RECONFIGURABLE DATAFLOW ARCHITECTURE

(71) Applicant: SambaNova Systems, Inc., Palo Alto, CA (US)

(72) Inventors: Raghunath Shenbagam, San Jose, CA (US); Ranen Chatterjee, Palo Alto, CA (US); Anand Misra, Palo Alto, CA (US); Jim Lewis, Palo Alto, CA (US); Benjamin Glick, Palo Alto, CA (US); Pushkar Nandkar, Palo Alto, CA (US); Sruthi Veeragandham, Palo Alto, CA (US)

(73) Assignee: SambaNova Systems, Inc., Palo Alto, CA (US)

(*) Notice: Subject to any disclaimer, the term of this patent is extended or adjusted under 35 U.S.C. 154(b) by 8 days.

(21) Appl. No.: 18/105,777

(22) Filed: Feb. 3, 2023

(65) Prior Publication Data
US 2024/0264896 A1    Aug. 8, 2024

(51) Int. Cl.
G06F 11/07    (2006.01)

(52) U.S. Cl.
CPC ...... *G06F 11/0793* (2013.01); *G06F 11/0721* (2013.01); *G06F 11/0769* (2013.01)

(58) Field of Classification Search
CPC ............. G06F 11/0793; G06F 11/0721; G06F 11/0769
USPC .......................................................... 714/10
See application file for complete search history.

(56) References Cited

U.S. PATENT DOCUMENTS

2019/0173736 A1* 6/2019 Ponnuswamy ....... H04L 41/145

FOREIGN PATENT DOCUMENTS

WO    2010142987 A1    12/2010

OTHER PUBLICATIONS

Wikipedia UUID page, retrieved from https://en.wikipedia.org/wiki/Universally_unique_identifier (Year: 2023).*
Wikipedia dataflow programming page, rretrieved from https://en.wikipedia.org/wiki/Dataflow_programming (Year: 2023).*
RDU (Year: 2023).*
UUID (Year: 2023).*

(Continued)

*Primary Examiner* — Yair Leibovich
(74) *Attorney, Agent, or Firm* — Flagship Patents; Sikander M. Khan; Shivshanker Naimpally

(57) ABSTRACT

A fault management system (FMS) receives events indicating an issue with a component in the system and determines, based on an inventory database, the component associated with the events. The FMS creates, based at least in part on the events, an error report that includes: (i) an error type identifying a type of error described in the error report, (ii) a timestamp indicating when the error report was created, and (iii) a universal unique identifier (UUID) to uniquely identify the error report. The FMS determines, based at least in part on the error report, a policy associated with the events and classifies the events, based at least in part on the policy, as either a threshold event or a discrete event. The FMS performs one or more actions to address the events.

20 Claims, 8 Drawing Sheets

(56) References Cited

OTHER PUBLICATIONS

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020.3012084, Jul. 27, 2020, 25 pages.

Prabhakar et al., Plasticine: A Reconfigurable Architecture for Parallel Patterns, ISCA, Jun. 24-28, 2017, 14 pages.

U.S. Appl. No. 17/378,391—Corrected Notice of Allowance, Mar. 25, 2022, 14 pages.

Zhang et al., "SARA: Scaling a Reconfigurable Dataflow Accelerator," 2021 ACM/IEEE 48th Annual International Symposium on Computer Architecture (ISCA), 2021, pp. 1041-1054.

\* cited by examiner

FAULT MANAGEMENT IN A RECONFIGURABLE DATAFLOW ARCHITECTURE

CROSS-REFERENCES AND INCORPORATIONS

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

Zhang et al., "SARA: Scaling a Reconfigurable Dataflow Accelerator," 2021 ACM/IEEE 48th Annual International Symposium on Computer Architecture (ISCA), 2021, pp. 1041-1054;

U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME,";

U.S. Nonprovisional patent application Ser. No. 15/930,381, filed May 12, 2020, entitled "COMPUTATIONALLY EFFICIENT GENERAL MATRIX-MATRIX MULTIPLICATION (GEMM),";

U.S. Nonprovisional patent application Ser. No. 16/890,841, filed Jun. 2, 2020, entitled "ANTI-CONGESTION FLOW CONTROL FOR RECONFIGURABLE PROCESSORS,";

U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 17/216,647, filed Mar. 29, 2021, entitled "TENSOR PARTITIONING AND PARTITION ACCESS ORDER,";

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";

U.S. Nonprovisional patent application Ser. No. 17/397,241, filed Aug. 9, 2021, entitled "FLOATING POINT MULTIPLY-ADD, ACCUMULATE UNIT WITH CARRY-SAVE ACCUMULATOR,";

U.S. Nonprovisional patent application Ser. No. 17/520,290, filed Nov. 5, 2021, entitled "SPARSE MATRIX MULTIPLIER IN HARDWARE AND A RECONFIGURABLE DATA PROCESSOR INCLUDING SAME,";

All of the related application(s) and documents listed above are hereby incorporated by reference herein for all purposes.

BACKGROUND

Technical Field

The technology disclosed relates to a reconfigurable dataflow architecture. In particular, it relates to fault management in a system that includes reconfigurable dataflow units (RDUs).

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to examples of the claimed technology.

A data center may include multiple host nodes, with each host node including multiple compute units, multiple memory units, switching components, and the like. In the data center, the state (e.g., health) of a component may affect the state of an upper-level component. When multiple applications are being executed by the components in the data center identifying and recovering from faults may enable the data center to operate efficiently and reduce downtime.

SUMMARY

The technology disclosed relates to fault management in a system that includes reconfigurable data units (RDUs).

A fault management system (FMS) receives one or more events indicating an issue with a component in the system and determines, based on an inventory database, the component associated with the one or more events. For example, the component may include (i) a reconfigurable dataflow unit (RDU), (ii) a pattern compute unit (PCU) included in the RDU, (iii) a pattern memory unit (PMU) included in the RDU, (iv) a data link included in the RDU, (v) a channel to access memory, the channel included in the RDU, or (vi) any combination thereof. The FMS may determine, based on the inventory database, a physical location of the component. The FMS creates, based at least in part on the one or more events, an error report. The error report includes: (i) an error type identifying a type of error described in the error report, (ii) a timestamp indicating when the error report was created, and (iii) a universal unique identifier (UUID) to uniquely identify the error report. The FMS determines, based at least in part on the error report, a policy associated with the one or more events and classifies the one or more events, based at least in part on the policy, as either a threshold event or a discrete event. A discrete event results in faulting a component that is associated with the discrete event. The decision to fault the component is taken immediately when diagnosing the event. A threshold event is determined based on a system specified (e.g., pre-determined) frequency of occurrence. Thus, if a threshold event occurs a particular number of times within a specified time interval, then the component is faulted. For example, the FMS may determine, based on the policy, a predetermined time interval associated with the one or more events. If the FMS determines that the one or more events occurred within a time interval less than the predetermined time interval (e.g., one minute, one hour, a specified number of hours, or the like), then the FMS may classify the one or more events as a threshold event. For example, a same (or similar) event that occurs N (N>0) times within a specified time interval (e.g., one hour) may be classified as a threshold event. The FMS may define when two or more events are considered to be similar. To illustrate, if a hardware component causes a particular event to occur at least three times in an hour, then the particular event may be classified as a threshold event. The FMS performs one or more actions to address the one or more events. The FMS may determine a payload included in a particular event of the one or more events, parse the payload and determine, based at least in part on the payload, the error type of the particular event. For example, performing the one or more actions to address the one or more events comprises may include isolating the component by changing a status of the component to an offline status and initiating a reinitialization (e.g., restart, reboot, or the like) of the component. Based at least in part on determining that reinitialization of the component solved the issue, the FMS may change the status of the component to an online status. Based at least in part on determining that reinitialization of the component failed to solve the issue, the FMS may keep the status of the component at the offline status. Particular aspects of the technology disclosed are described in the claims, specification and drawings.

BRIEF DESCRIPTION OF THE DRAWINGS

The technology will be described with reference to the drawings, in which.

Figure 1:
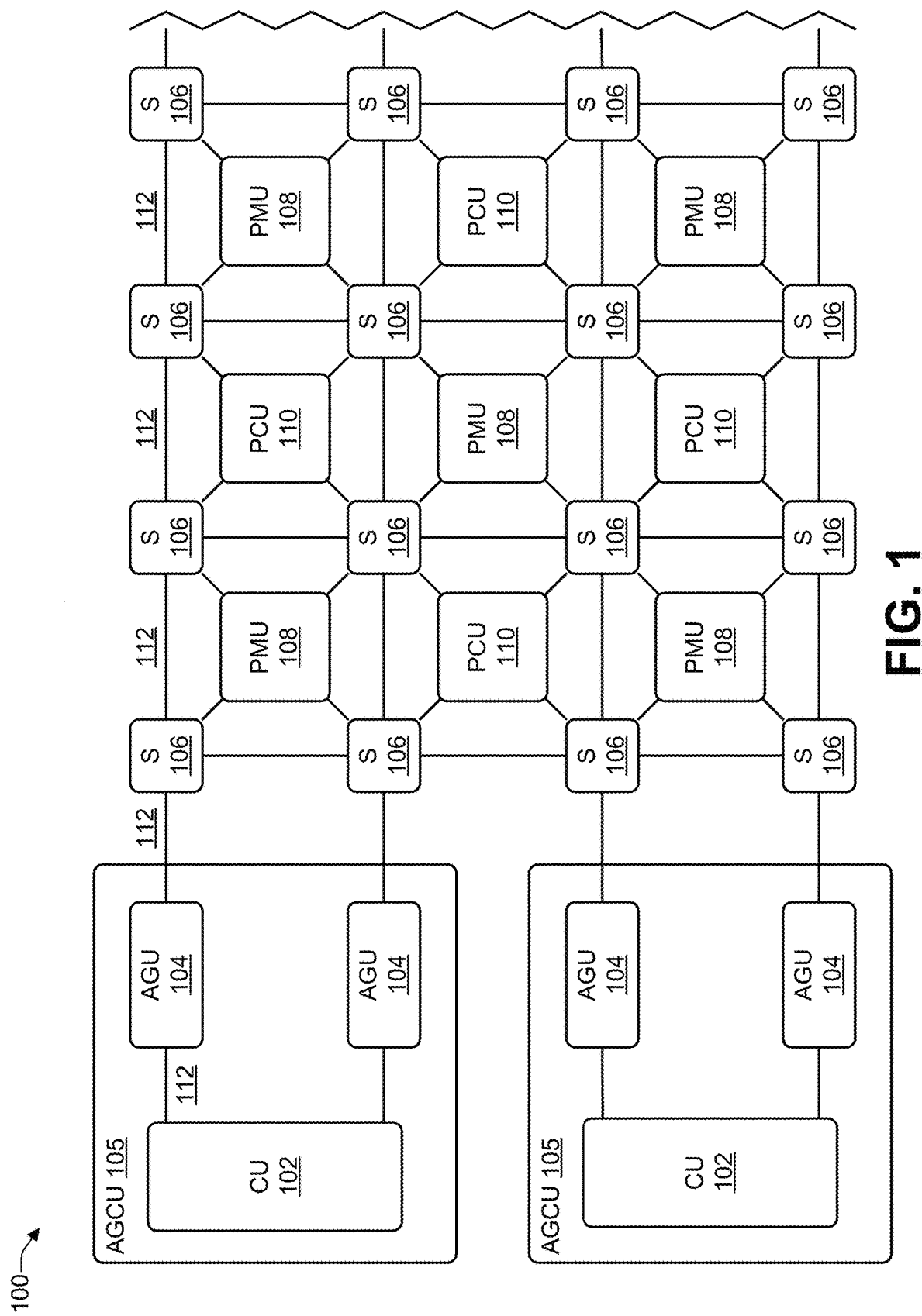
FIG. 1 illustrates an example of a reconfigurable data unit (RDU), according to some embodiments.

In the figures, like reference numbers indicate functionally similar elements. The systems and methods illustrated in the figures, and described in the Detailed Description below, may be arranged and designed in a wide variety of different ways. Neither the figures nor the Detailed Description are intended to limit the scope of the claims. Instead, they merely represent examples of different ways of using the disclosed technology.

DETAILED DESCRIPTION

The technology disclosed can be practiced as a system, method, or article of manufacture. One or more features of a particular example can be combined with the base example. Examples described herein that are not mutually exclusive are taught to be combinable. One or more features of one example can be combined with other examples. This disclosure periodically reminds the user of these options. Omission from some examples of recitations that repeat these options should not be taken as limiting the combinations taught in the preceding sections—these recitations are hereby incorporated forward by reference into each of the following examples.

Described herein are various examples of a fault management system to manage faults in a reconfigurable data unit architecture (RDA). The RDA may include multiple reconfigurable data units (RDUs). An RDU is also referred to as a Coarse Grained Reconfigurable processor (CGR). Each RDU (e.g., CGR) may include multiple compute units, multiple memory units, and a switching fabric (comprised of one or more switches) to route signals between the compute units and the memory units. A compute unit in an RDU may be referred to as a pattern compute unit (PCU). A memory unit in an RDU may be referred to as a pattern memory unit (PMU). In some cases, a PCU and PMU may be physically or logically joined to create a pattern compute and memory unit (PCMU). A tile refers to an individual component of an RDU including, for example, a PCU, a PMU, a PCMU, or another component of an RDU. Thus, an RDU includes multiple tiles. The switching fabric may include multiple switches and multiple buses. For example, each of the buses may be a Peripheral Component Interconnect Express (PCIE) bus or similar. An eXtended RDU (XRDU) is a board that includes at least two RDUs. A host node may host multiple XRDUs. A data center may include multiple XRDUs.

The systems and techniques described herein provide a fault management framework for a system, such as a data center, that includes multiple RDUs. The fault management framework enables reporting, diagnosing, and analyzing errors and events associated with an RDU-based system. The framework may perform automatic recovery actions for particular types of component failures and suggest corrective actions to recover from faults. The fault management framework processes RDU events, including classifying RDU events based on frequency and severity, maintaining resource availability, maintaining system availability (uptime), and the like.

The fault management framework may include two components: (1) a service component executing on each host node and (2) a centralized fault management system that interacts with multiple service components executing on multiple host nodes. For example, the service component may run on an operating system (OS) of a host node, in a virtual guest machine being executed by the host node, or the like. The centralized fault management system (e.g., in the data center) may interact with the service components that are being executed by each host node and may aggregate the health of the host nodes (e.g., at a rack level, at a data center level, or both) to provide automatic alerts and management of multiple host nodes. The centralized fault management system may provide a user interface (UI) to enable a system administrator to view an overview of the components in the system (e.g., in the data center) and hierarchically drill down (e.g., zoom-in) to view the status of individual components down to the RDU level. For example, the centralized fault management system may enable an individual RDU to be selected to view the status of individual tiles (e.g., individual PCUs, individual PMUs), individual switch components, individual buses, and the like.

Faults occurring in the system may be either hardware-related faults ("hardware faults") or software-related faults ("software faults"). After receiving a notification that a hardware fault occurred, the fault management framework may diagnose the hardware fault. The hardware fault may occur during hardware initialization (e.g., prior to the associated hardware becoming operational) or at runtime (e.g., when the associated hardware is operational). The fault management framework provides a consolidated view of the health of the entire system health including, for example, synchronization of fault reports with virtual guest machines and XRDU management controller error events. The virtual guest machines may use virtual communication channels to exchange of information. The XRDU management controller may use hardware mailbox communication channels (which may be proprietary in some cases) for sharing XRDU fault information with the fault management framework.

An error event ("event") may be categorized as either a discrete event or a threshold event. A discrete event results in the immediate faulting of the component associated with (e.g., that caused) the event. If an error event occurs with at least a threshold frequency (e.g., at least N times within a specified time period), then the error event is categorized as a threshold event. A component is marked as having a degraded state when the component is functioning at less than a system specified state or when one or more sub-components are faulted. For example, a link (e.g., PCIe link) that is operating at a reduced bandwidth without any errors is shown as having a degraded state when operating at a reduced capacity. A component is marked as having a degraded state when one or more (but not all) of its sub-components is faulted. For example, an XRDU is shown as having a degraded state when one of the RDUs in the XRDU is faulted. A component is marked as having a faulted state when all of the critical sub-components included in the component are faulted. For example, an XRDU is marked faulted when all of the RDUs in the XRDU are faulted. The state of a sub-component affects the state of its parent component but not the state of higher-level components (e.g., grand-parent level components and above). The fault management framework may monitor RDUs (hardware components) included in individual XRDUs, tiles within an RDU, local interconnections (e.g., PCIe or similar) between RDUs, communication links (e.g., PCIe or similar) between a host node and each XRDU hosted by the host node, and host node components (e.g., host memory, networking devices, and the like).

Terminology

As used herein, the phrase one of means exactly one of the listed items. For example, the phrase "one of A, B, and C" means any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

AGU—address generator unit (AGU). AGUs and CUs interconnect RDUs to the rest of the system, including off-chip memory (e.g., DRAM), other RDUs and the host processor. RDUs may be connected to each other using a high-speed communication link for efficient execution of applications that use more than a single RDU. The AGUs and CUs working together with the PMUs enable RDA to efficiently process sparse and graph-based datasets.

AI—artificial intelligence.

AIR—arithmetic or algebraic intermediate representation.

ALN—array-level network.

Buffer—an intermediate storage of data.

CGRA—coarse-grained reconfigurable architecture. A reconfigurable data processor may include a CGRA. A CGRA includes an array of coarsely reconfigurable units, and one or more networks to transport data and control information among the coarsely reconfigurable units. The CGRA uses the control information to manage the rate of execution of the coarsely reconfigurable units and prevent communication and processing bottlenecks and buffer overflows.

Compiler—a translator that processes statements written in a programming language to machine language instructions for one or more tiles to execute. A compiler may include multiple stages to operate in multiple steps. Each stage may create or update an intermediate representation (IR) of the translated statements.

Computation graph—some algorithms can be represented as computation graphs. As used herein, computation graphs are a type of directed graphs comprising nodes that represent mathematical operations/expressions and edges that indicate dependencies between the operations/expressions. For example, with some machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

Coarsely Reconfigurable unit—a circuit that can be configured and reconfigured to locally store data (e.g., a memory unit or a PMU), or to execute a programmable function (e.g., a compute unit, a PCU, data transport, or switch). A coarsely reconfigurable unit includes hardwired functionality that performs a limited number of functions used in computation graphs and dataflow graphs. Further examples of coarsely reconfigurable units include a CU and an AGU, which may be combined in an AGCU.

CU—coalescing unit. AGUs and CUs interconnect RDUs to the rest of the system, including off-chip DRAM, other RDUs and the host processor. A high-speed connection between RDUs is provided for efficient execution of applications that use more than a single RDU. The AGUs and CUs working together with the PMUs to enable RDUs to efficiently process sparse and graph-based datasets.

Data Flow Graph—a computation graph in which nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically fabricated electronic component, e.g., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are common in the industry, and often indistinguishable from monolithic circuits for the average user.

A logical RDU or logical coarsely reconfigurable unit—an RDU or a coarsely reconfigurable unit that is physically realizable, but that may not have been assigned to a physical RDU or to a physical coarsely reconfigurable unit on an IC.

ML—machine learning.

PCU—pattern compute unit—a compute unit that can be configured to perform one or more operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput.

Pipeline Stages—a pipeline is divided into stages that are coupled with one another to form a pipe topology.

PMU—pattern memory unit—a memory unit that can locally store data.

PNR—place and route—the assignment of logical coarsely reconfigurable units and associated processing/operations to physical coarsely reconfigurable units in an array, and the configuration of communication paths between the physical coarsely reconfigurable units.

RAIL—reconfigurable dataflow unit (RDU) abstract intermediate language.

RDU—reconfigurable dataflow unit—an array of compute units and memory units (which may include FCMUs), coupled with each other through an array-level network (ALN), and coupled with external elements via a top-level network (TLN).

SIMD—single-instruction multiple-data—an arithmetic logic unit (ALU) that simultaneously performs a single programmable operation on multiple data elements delivering multiple output results.

TLIR—template library intermediate representation.

TLN—top-level network.

FIG. 1 illustrates an example of a reconfigurable data unit (RDU) 100, according to some embodiments. In the RDU 100, a coalescing unit (CU) 102 is connected to multiple Address Generator Units (AGUs) 104. Each AGU 104 is connected to a switch (S) 106 that is part of a switch fabric that includes multiple switches 106, as shown in FIG. 1. Each switch 106 is connected to at least 3 other switches 106. Each switch 106 may be connected to at least one tile. As used herein, the term tile refers to a component of the RDU 100. In some cases, a CU 102 may be combined with one or more AGU 104 to create an AGCU 105, as shown in FIG. 1.

Each link 112 uses a high-speed bus, such as, an array level network (ALN), top level network (TLN) or the like. For ease of illustration, not all the connections are labeled but it should be understood that each line interconnecting two of the components (S 106, PMU 108, PCU 110) is a link 112. Each RDU 100 may be implemented as a single integrated circuit (e.g., system-on-chip (SOC)) or, in some cases, a single integrated circuit (e.g., XRDU) may include multiple RDU 100. The RDU 100 may access one or more memory units 114 via one or more buses, such as a representative bus 116 (e.g., Peripheral Component Interconnect Express (PCIe) or similar). Each of the memory units 114 may be implemented using a dual inline memory module (DIMM) or similar. The memory units 114 may be on-chip, e.g., co-located with the RDU 100 on an integrated circuit (IC), off-chip (e.g., not located on the same IC as the RDU 100), or a combination of both, in which some of the memory units 114 are located on-chip (e.g., for use as a cache or buffer) and a remainder of the memory units 114 are located off-chip.

The RDU 100 is a next-generation processor that provides native dataflow processing and programmable acceleration using a tiled architecture that comprises a network of reconfigurable functional units. The tiled architecture enables a broad set of highly parallelizable patterns contained within dataflow graphs to be efficiently programmed as a combination of compute, memory and communication networks. The PCUs 110, the PMUs 108, and the switch fabric that includes the switches 106 provide the resources for the graph execution. These elements are programmed by middleware (e.g., low-level runtime software) to suit application specific dataflow patterns, such as many-to-one, one-to-many, broadcast, and the like, to support each application's particular requirements. Spatial programming techniques may be applied to enable the layout of the operations on the RDU 100 to reduce data movement to achieve increased efficiency. When an application is launched, the middleware determines, at runtime, a configuration that maps the execution model (e.g., graph) of the application to available RDUs. In this way, the system may perform as a pipeline, with different parts of the RDUs executing different layers of a model, operating simultaneously with different data at each stage. Data is able to flow through each layer unobstructed and avoid the latency of context switching and memory access that is present in a conventional system.

The middleware's ability to configure the components of the RDU 100 to suit an application's real time execution flow and the programmability of the RDU 100 enable the system to be configured for a wide variety of workloads, including machine learning, scientific computing and other data-intensive applications. The ability to rapidly reconfigure each RDU, such as the RDU 100, at runtime enables the architecture to be quickly repurposed for a variety of algorithms. These features provide key advantages over fixed application-specific integrated circuit (ASIC) designs that may take years to develop and cannot be modified if the algorithm changes or if the workload is different. In contrast to the time-consuming, complex, low-level programming and long compilation times of field programmable gate arrays (FPGAs), RDUs can be reconfigured in microseconds. The RDU 100 architecture provides a level of flexibility and reconfigurability that enables programmers to work in high-level design languages while the RDU 100 architecture provides enhanced execution efficiency, simplified compilation, and performance. Advantages of the dataflow approach include: (i) less data and code movement, thereby reducing memory bandwidth usage and enabling the use of larger, terabyte-sized attached memory for large model support, (ii) simultaneous processing of an entire graph in a pipelined fashion to enable high utilization across a broad range of batch sizes and to reduce the use of large batch sizes to achieve acceptable efficiency, (iii) high on-chip memory capacity and localization, as well as high internal fabric bandwidth enable the ability to run very large models with high performance, (iv) pipeline processing on RDUs provides predictable, low-latency performance. Thus, the hierarchical structure of the RDU architecture simplifies compiler mapping and significantly improves execution efficiency.

The RDU 100 is designed to efficiently execute applications, such as, for example, dataflow graphs. The RDU 100 includes a tiled array of reconfigurable processing units (PCUs 110) and memory units (PMUs 108) connected through a high-speed, three-dimensional on-chip switching fabric (switches 106 and buses 112). When an application is instantiated, the software dynamically and in real-time configures the components (102, 104, 106, 108, 110, 112) of the RDU 100 to execute a dataflow graph associated with the application.

Each PCU 110 is designed to execute a single, innermost-parallel operation in an application. The data-path in each RDU 100 is configured by the software as a multi-stage, reconfigurable Single Instruction/Multiple Data (SIMD) pipeline for the particular application that is being executed. In this way, each RDU 100 is able to achieve high computational density and exploit both loop-level parallelism across lanes and pipeline parallelism across stages.

Each PMU 108 provides memory-related functions, including providing a specialized scratchpad, for one or more of the PCUs 110. The capacity and distribution of PMUs 108 throughout the RDU 100 reduce data movement, reduce latency, increase bandwidth, and avoid off-chip (e.g., outside the RDU 100) memory accesses.

The high-speed switching fabric that connects PCUs 110 and PMUs 108 includes three switching networks: scalar, vector and control. These switching networks may be used to create a three-dimensional network that runs in parallel to the rest of the components within the RDU 100. The switching networks differ in granularity based on the type and the size of data being transferred. The scalar networks may operate at a word-level granularity and the vector networks may operate at a multiple word-level granularity and the control networks at bit-level granularity.

The AGUs 104 and the CU 102 provide the interconnections between the RDU 100 and the rest of the system, including, for example, off-chip DRAM, other RDUs, a host processor, and the like. A high-speed path between RDUs may be provided for efficient processing of algorithms that use more than a single RDU. The AGUs 104 and CUs 102 may work with the PMUs 108 to enable the RDU 100 to efficiently process sparse and graph-based datasets. Reconfigurability, exploitation of parallelism at multiple levels, and the elimination of instruction processing overhead enables the RDU 100 to provide a significant performance advantage over conventional architectures.

The middleware is able to shield algorithm developers from low-level tuning needs that are common on conventional architectures. Software programmers can maximize productivity by designing applications using high-level frameworks (e.g., PyTorch, TensorFlow, and the like) without worrying about architectural details of the RDU 100. SambaFlow software is software that may be used prior to runtime to perform an analysis of an application and build one or more dataflow graphs based on the analysis. SambaFlow is also used at runtime to reconfigure, in real-time, the various resources at the RDU level and above to use the available resources. For example, SambaFlow may identify portions of an application that can be executed in parallel and allocate resources, in real-time, to enable the identified portions of the application to be executed in parallel to enable efficient execution and effective use of available resources. The software automatically decomposes the dataflow graph based on the knowledge of the available resources (e.g., RDU components) to efficiently execute the dataflow graph. This automated process results in a fully optimized, custom accelerator while avoiding low-level programming and time-consuming trial and error tuning. The software also automates the scaling of workloads across multiple RDUs. In contrast, when using conventional architectures, one challenge is to find a way to partition the workload and spread it across the available resources. In addition, when using conventional architectures, scaling an application, such as moving from a single processor to a large computational cluster, requires considerable extra development effort, orchestration and specialized expertise. In contrast, the software, provides a consistent programming model that can be used to scale from a single RDU to multi-RDU configurations. The ability of the SambaFlow software to automatically understand the underlying hardware resources and configure the hardware to support the dataflow of a specific application, in real-time, provides the unique advantage of fully automating both multi-chip, data-parallel, and model-parallel support. A developers may allocate one or more RDUs and the SambaFlow software compiles an application to automatically provide efficient execution across the available resources.

Figure 2:
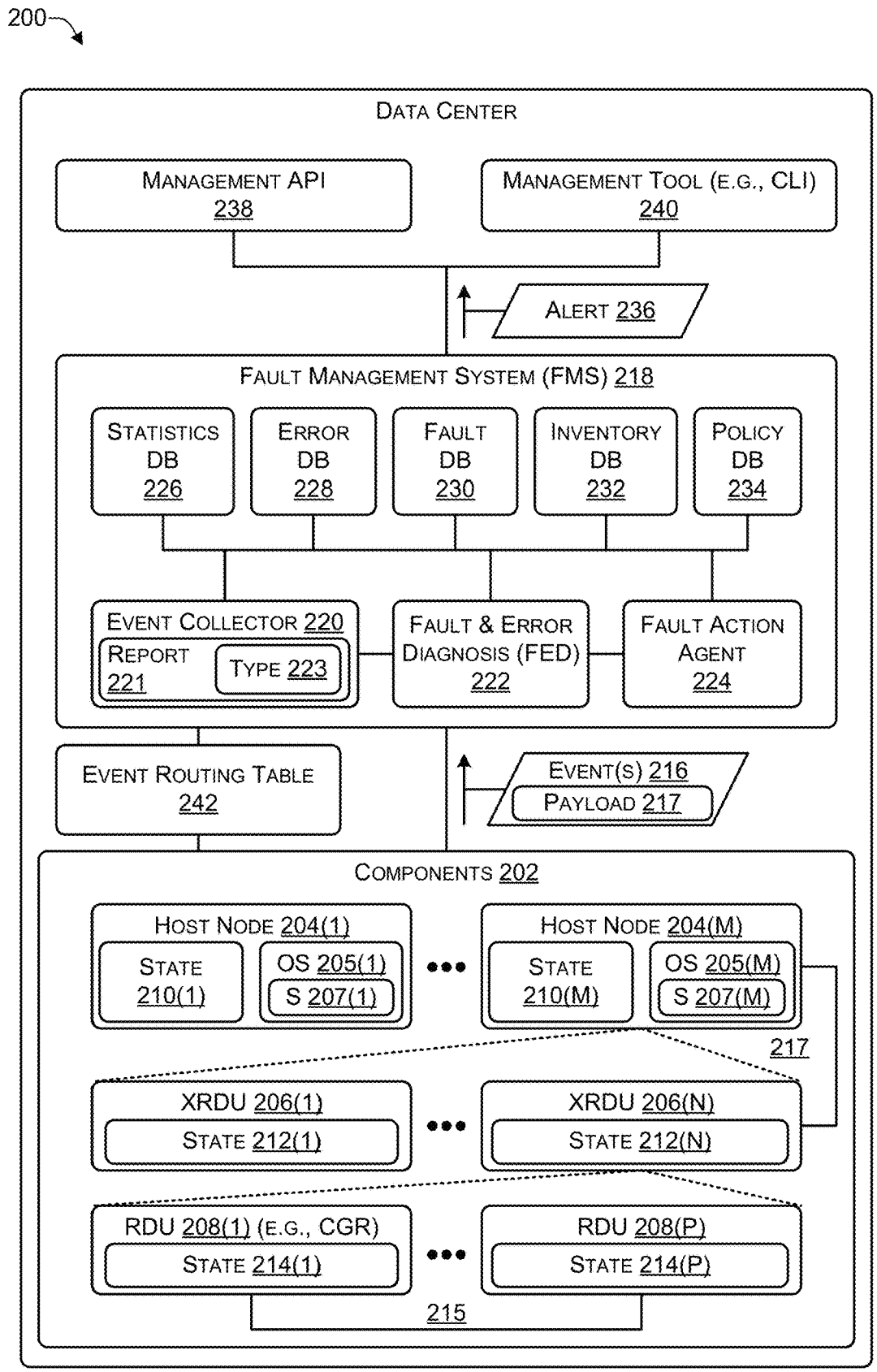
FIG. 2 illustrates an example of a data center that includes multiple reconfigurable data units (RDUs), according to some embodiments.

FIG. 2 illustrates an example of a data center 200 that includes multiple reconfigurable data units (RDUs), according to some embodiments. The data center 200 includes components and corresponding component data 202. The component data 202 corresponds to physical components in the data center 200, such as one or more host nodes, e.g., host node 204(1) to host node 204(M), (M>0). For ease of understanding, component data and component may, in some cases, be used interchangeably. However, it should be understood that the component data 202 is data associated with the hardware and software components of the data center 200.

On a physical level, each host node includes one or more XRDUs. For example, the host node 204(M) includes XRDU 206(1) to XRDU 206(N) (N>0). Each XRDU 206 includes two or more RDUs. For example, the XRDU 206(N) includes RDU 208(1) to RDU 208(P) (P>1). Each of the host nodes 204, the XRDUs 206, and the RDUs 208 have an associated state. For example, the host node 204(1) has a state 210(1), the host node 204(M) has a state 210(M), the XRDU 206(1) has a state 212(1), the XRDU 206(N) has a state 212(N), the RDU 208(1) has the state 214(1), and the RDU 208(P) has the state 214(P). The state of each of the RDUs 208 may be one of online state (e.g., normal or healthy), degraded state, or faulted state.

If the state 214(P) is an online state, then each of the components (e.g., PCU, PMU, switch, bus, or the like) of the RDU 208(P) are functioning properly. If the state 214(P) is a degraded state, then one or more components (e.g., PCU, PMU, switch, bus, or the like) of the RDU 208(P) have a fault (e.g., one or more components are non-functional). If the state 214(P) is a faulted state, then more than a threshold number of components (e.g., PCU, PMU, switch, bus, or the like) of the RDU 208(P) have a fault.

If the state 212(N) is an online state, then each of the components (RDU 208(1) to 208(P)) of the XRDU 206(N) are functioning properly. If the state 212(N) is a degraded state, then one or more RDUs 208 of the XRDU 206(N) have either a degraded state or a faulted state. If the state 212(N) is a faulted state, then more than a threshold number of the RDUs 208 of the XRDU 206(N) are either partially functional (e.g., in a degraded state) or non-functional (e.g., in a faulted state).

If the state 210(M) is an online state, then each of the XRDUs 206(1) to 206(N) hosted by the host node 204(M) are functioning properly. If the state 210(M) is a degraded state, then one or more XRDUs 206 of the host node 204(M)

may have either a degraded state or a faulted state. If the state 210(M) is a faulted state, then more than a threshold number of the XRDUs 206 of the host node 204(M) may be either partially functional (e.g., in a degraded state) or non-functional (e.g., in a faulted state).

A resource manager 246 manages the software components and hardware components associated with each XRDU 206 (e.g., at the XRDU level and below). For example, the resource manager 246(N) may manage the RDUs 208(1) to 208(P) and associated software.

When a particular hardware component of the components corresponding to the component data 202 identifies an issue, the particular hardware component may send an event 216 to a fault management system 218. The issue, such as a fault, may be identified at the level of a component (PCU, PMU, switch, bus, or the like) of one of the RDUs 208. In addition to affecting the state 214 of the RDU 208 that includes the affected component, the issue also affects the state of a one level higher component, such as the state 212 of the XRDU 206. For example, a degradation or fault in a PCU or PMU in the RDU 208(P) affects the state 214(P) of the RDU 208(P). A state of a component is marked degraded when the component is functioning below a system specified state. For example, a PCIe link operating at a reduced bandwidth without any errors is marked degraded. The reduced capacity operation is a valid operational state for this particular component. In addition, a component is marked degraded when one (or more) sub-components included in the component are faulted. For example, an XRDU is marked degraded when at least one of the RDU components of the XRDU are faulted. A component is marked faulted when all of the critical sub-components included in the component are faulted. For example, an XRDU is marked faulted when all of the RDU components of the XRDU are Faulted. The state of a sub-component affects the state of the sub-component's parent component, while grand-parent and above components are not impacted at this point.

A fault management system 218 is used to manage a system, such as the data center 200, that includes RDUs, such as the RDUs 208. The fault management system 218 provides a framework for reporting, diagnosing, analyzing events, and classifying events associated with the system. The fault management system 218 may perform automatic recovery actions for a particular event (e.g., component failure), or suggest a corrective action to recover from a particular event (e.g., fault). The fault management system 218 processes fault-related events associated with the RDUs 208, including classifying them based on frequency and/or severity and maintaining resource availability and system uptime. The fault management system 218 may use a service 207 running on an operating system 205 of each of the host nodes 204 (or inside a virtual guest machine). The fault management system 218 may operate at the data center level and interact with the service 207 on each of the nodes 204 to aggregate the health (e.g., state 210) of the host nodes 204 to provide automatic alerts and management of the nodes 204.

The fault management system 218 receives events, such as the event 216, for diagnosis. The events may occur during hardware initialization or at runtime (e.g., when the data center 200 is being used). The fault management system 218 provides a consolidated view of the health of the entire system (from end to end), e.g., the data center 200. The fault management system 218 may synchronize and correlate fault reports with virtual guest machines and with error events generated by XRDU management controller (MC) 213. A virtual guest machine may be created using a portion of the components (e.g., PMUs 108, PCUs 110, Switches 106, and the like) of the RDU 100 of FIG. 1. Thus, the RDU 100 may host one or more virtual guest machines. The virtual guest machines may use virtual communication channels for sharing events with the fault management system 218. For example, in FIG. 1, virtual communication channels may be temporarily defined between one or more tiles and may include one or more switches 106 and one or more links 112. The XRDU management controllers 213 may use hardware mailbox communication channels for sharing XRDU fault information with the fault management system 218. The hardware mailbox communication channels may be located in the RDU (e.g., system-on-a-chip (SOC)).

The error events, such as the event(s) 216, may be categorized, using a policy associated with the event 216(s), as either discrete event(s) or threshold event(s). The policy may specify a frequency of occurrence, e.g., at least a number of events occurring time interval. If the FMS 218 determines that the events 216 are occurred at least at the specified frequency within the specified time interval, then the FMS 218 may classify the events 216 as a threshold event. For example, if the events 216 include three or more of the same (or similar) event that occurred within a particular time interval (e.g., one hour), then the FMS 218 may classify the events 216 as a threshold event. The policy associated with the events 216 may define when two or more of the events 216 are considered similar. For example, an issue with a hardware component may cause multiple events that are similar but not identical. To illustrate, if the events 216 include N (e.g., 3 or more) similar events that occur within an hour, then the events 216 may be classified as a threshold event. A discrete event result in immediate faulting of the associated component. A discrete event does not take into account frequency of occurrence. Instead, the decision to fault the component is taken immediately, as part of diagnosing the event. For example, a PCIe link bandwidth that is determined to be below a specified functional threshold causes the corresponding PCIE link component to be faulted. A discrete event results in the state 210, 212, 214 of one of the components 204, 206, 208, respectively, becoming faulted. For threshold events, when a same (or similar) event occurs with at least a threshold frequency, then the state 210, 212, 214 of the corresponding one of the components 204, 206, 208 becomes faulted. The following components that correspond to the component data 202 are monitored by the fault management system 218: the RDUs 208, the individual components (e.g., PCU 110, PMU 108, and the like of FIG. 1) of each RDU 208, interconnections 215 between the RDUs 208, memory units 114 accessible to each RDU 208, links 217 between each host node 204 and XRDU 206 hosted by the host node 204, and host node components, such as, for example, host memory, networking devices, and the like.

The fault management system 218 may include an event collector (EC) 220, a fault and error diagnosis (FED) engine 222, and a fault action agent 224. The event collector 220 may store incoming events, such as the event 216, in an error database (DB) 228 and maintain statistics associated with the events received in a statistics database 226. The error event 216 that is delivered to the event collector 220 includes a payload 217. The event collector 220 parses the payload 217 to determine whether additional processing of the payload 217 is to be performed.

After parsing the payload 217, the event collector 220 creates error report (ER) 221 that is stored in the error database 220. Each error report, such as the representative report 221, may include a universal unique identifier (UUID) 225 and a timestamp 227 indicating when the event 216 was received by the fault management system 218. As part of the process to generate the error report 221, the event collector 220 may look-up information (e.g., from the payload 217) in an inventory database 232 to map the event 216 to one of the components (e.g., corresponding to the component data 202) identified in the inventory database 232. The inventory database 232 identifies the components in the system (e.g., the data center 200) and their relationship to other components in the system. For example, the inventory database 232 may include information about the RDU 208(P) and indicate that the RDU 208(P) is (logically and/or physically) included in the XRDU 206(N) which is (logically and/or physically) included in the host node 204(M). The inventory database 232 may include a physical location of each of the components, e.g., RDU 208(P) is located in the second floor of the data center, room X, rack Y, shelf Z. In this way, a technician can easily find and repair and/or replace a particular component that is in a fault state if the particular component cannot be reinitialized. Thus, the event collector 220 uses the inventory database 232 to map the error event 216 to one of the components in the inventory DB 232, thereby enabling the error report 221 to identify a specific physical component of the components associated with the error event 216.

The event collector 220 may send the error report 221 to the Fault Event Diagnosis (FED) engine 222 to diagnose the error. After the event collector 220 generates the error report 221, the event collector 220 determines and assigns an error type 223 to the error report 221 and adds the error report 221 to the error database 228 for persistent storage. Each error report in the error database 228 has a fault UUID 225 associated with the error report 221. Initially, the UUID may empty (or have a null value). If the FED 222 classifies the event 216 as a fault, a fault UUID is generated for the fault and the error report 221 has the fault UUID entry 225 updated to indicate whether the event 216 is diagnosed as a fault. Typically, a relatively few types of events are classified as a fault.

The event collector 220 may perform error event flood control (e.g., throttling). For example, if the event collector 220 determines that identical error events associated with the same component are being received in a threshold time interval, then each error event may not be stored as separate error report entry. Instead, the event collector 220 may create a single error report that includes an error count indicating how many times the error event occurred within the threshold (e.g., predetermined) time interval, thereby reducing the possibility of a large number of error reports from overwhelming the fault management system 218.

After the event collector 220 processes an error event, such as the event 216, and creates the report 221, the event collector 220 provides the report 221 to the FED engine 222 to diagnose the error event. Based on the error type 223, the FED 222 selects a particular policy from multiple policies 233(1) to 233(R) (R>0) that are defined and stored in a policy database (DB) 234. For each error type 223, the policy DB 234 provides a policy 233 that includes: (i) mapping fault type, (ii) a non-critical threshold value with time interval, (iii) a non-recoverable threshold value with time interval, (iv) action(s) to perform (e.g., to mitigate the effect of the error event), (v) a description of the error event, and (vi) recovery action(s) to clear the fault. The fault type corresponds to the error event which indicates that a component is faulty. The non-critical threshold value with time interval may be used to provide a warning to indicate that a non-critical error has occurred within a particular time interval. A non-recoverable threshold with time interval indicates that an error that has occurred within a particular time interval indicates that a particular component is to be faulted.

The FED engine 222 uses the error type 223 to determine (e.g., retrieve) the associated policy 233 that is stored in the policy DB 234. The FED engine 222 may determine whether the event 216 is a threshold fault (e.g., N or more events occur within a particular time interval, N>0) or a discrete fault. If the event 216 is a discrete fault, the FED engine 222 generates the fault report 221 and records the fault report 221 in a fault database (DB) If the event 216 is a threshold fault, the FED engine 222 determines the associated policy 233 in the policy DB 234 and applies the associated policy 233 to determine if a threshold (e.g., number of times the fault has occurred within a specified time interval) has been satisfied. If the threshold had been satisfied, then the FED engine 222 generates the fault report 221 and records the fault report 221 in the fault DB 230.

For both discrete and threshold faults (that satisfy the threshold in the policy 233 associated with individual faults), the FED engine 222 instructs a fault action agent (FAA) 224 to address the fault report 221 associated with the event 216. If the event 216 is insufficient to be considered a fault state (such as correctable errors that have not satisfied the associated predetermined threshold), the FED engine 222 does not report the fault. All events are recorded but some events may not qualify the component to be marked as Faulty and thus those events may not result in any Fault.

After the FED engine 222 diagnoses the fault event 216 and creates the fault report 221, the FED engine 222 provides the fault report 221 to Fault Action Agent (FAA) 224. The FAA 224 initiates one or more actions, based on the report 221 (including the type 223), to isolate (e.g., route traffic around a faulted component), recover the faulted component (e.g., restart or reinitialize the component), or both. For example, if the report 221 indicates a memory (e.g., DIMM) fault, then the FAA 224 coordinates with the appropriate resource manager 246 to wait for any application still executing on the associated RDU to complete executing. When the associated RDU is idle (e.g., no application is using it), then the memory re-interleaving is triggered to keep the memory available, but at a reduced capacity. In this way, the entire system (at the XRDU, host node, or data center level) is not taken out of service, thereby enabling the faulted memory to be serviced at a convenient time, such as a time when applications are not being executed or non-critical applications can be re-scheduled to enable servicing (e.g., replacing) the memory. As another example, if the report 221 indicates a tile (e.g., PMU or PCU) fault, then the FAA 224 works with the resource manager 246 to wait for any application executing on the associated RDU to complete executing. The RDU is reset when it is idle (no application is using it). The FAA 224 may initiate an RDU reset or a manual RDU reset may be where performed. For example, a system administrator may decide to recover the RDU via a reset tool. As a further example, if the report 221 indicates a link-related issue, then the FAA coordinates with the resource manager 246 to update the node P2P table to reflect the faulted link in the topology described by the node P2P table. The node P2P table is maintained by the resource manager and is not part of the event routing table.

Based on one of the policies 233 (in the policy DB 234) associated with the report 221, the fault management system 218 may send an alert 236 to an alert service. In some cases, the alert service may be external to the fault management framework. Event routing tables 244 may be used to route an event generated by a particular component to an application that is using at least a portion of the particular component to determine the payload 217.

Thus, the fault management system 218 provides a fault management infrastructure for systems, such as the data center 200, that include RDUs (e.g., the RDUs 208). The event routing tables 244 dynamically map resources (e.g., RDUs, tiles, memory, and the like) when multiple applications are executing and consuming resources and are dynamically adjusted as applications come and go (e.g., a first application completes executing and a second application begins executing). The granularity of the fault management system 218 is at the tile level (e.g., RDU components).

When a fault in a particular component (e.g., RDU, tile, or the like) is detected, the fault management system 218 may map out the faulty components so that they are no longer used. In some cases, the fault management system 218 may perform automatic recovery actions for particular component failures or suggest corrective action(s) (e.g., replace RDU) to recover from a particular fault. The fault management system 218 is capable of handling all RDU-related error events. For example, the fault management system 218 may classify the error event based on the severity and perform actions to maintain resource availability and system uptime. The fault management system 218 system may interact with the node service 207 to aggregate the health of all nodes at the rack or datacenter level. For example, if a particular RDU hangs, then the fault management system 218 takes the particular RDU out of service and sends the alert 236 to notify a system engineer or other data center personnel.

The fault management system 218 dynamically processes soft faults and hard faults. For example, if a particular application uses the RDU 208(P) and the RDU 208(P) hangs (e.g., becomes degraded or faulted), then the fault management system 218 may take corrective action and attempt to bring the RDU 208(P) back online, without generating a fault report to avoid concerning a user. If the RDU 208(P) can't be brought back online, then the fault management system 218 may mark the RDU 208(P) as faulted and recovery may be done at the RDU-level. The fault management system 218 may use fault recovery techniques, including software-based recovery techniques and hardware-based recovery techniques before labelling the RDU as faulted.

If tile (lowest level) has an issue, the RDU to which the tile belongs is marked as degraded. If there a sufficient number of degraded RDUs in an XRDU, then the XRDU is marked as degraded. A user can use UI of SNFM to view which tile, RDU, etc. are marked degraded and why. The user can use this info to manually specify not to run apps using the degraded components or automated job scheduling software may use this info to automatically run apps and avoid the degraded components if a particular application requires a certain number of resources. Could uses degraded component for non-real-time, slower, less resource intensive tasks.

Figure 3:
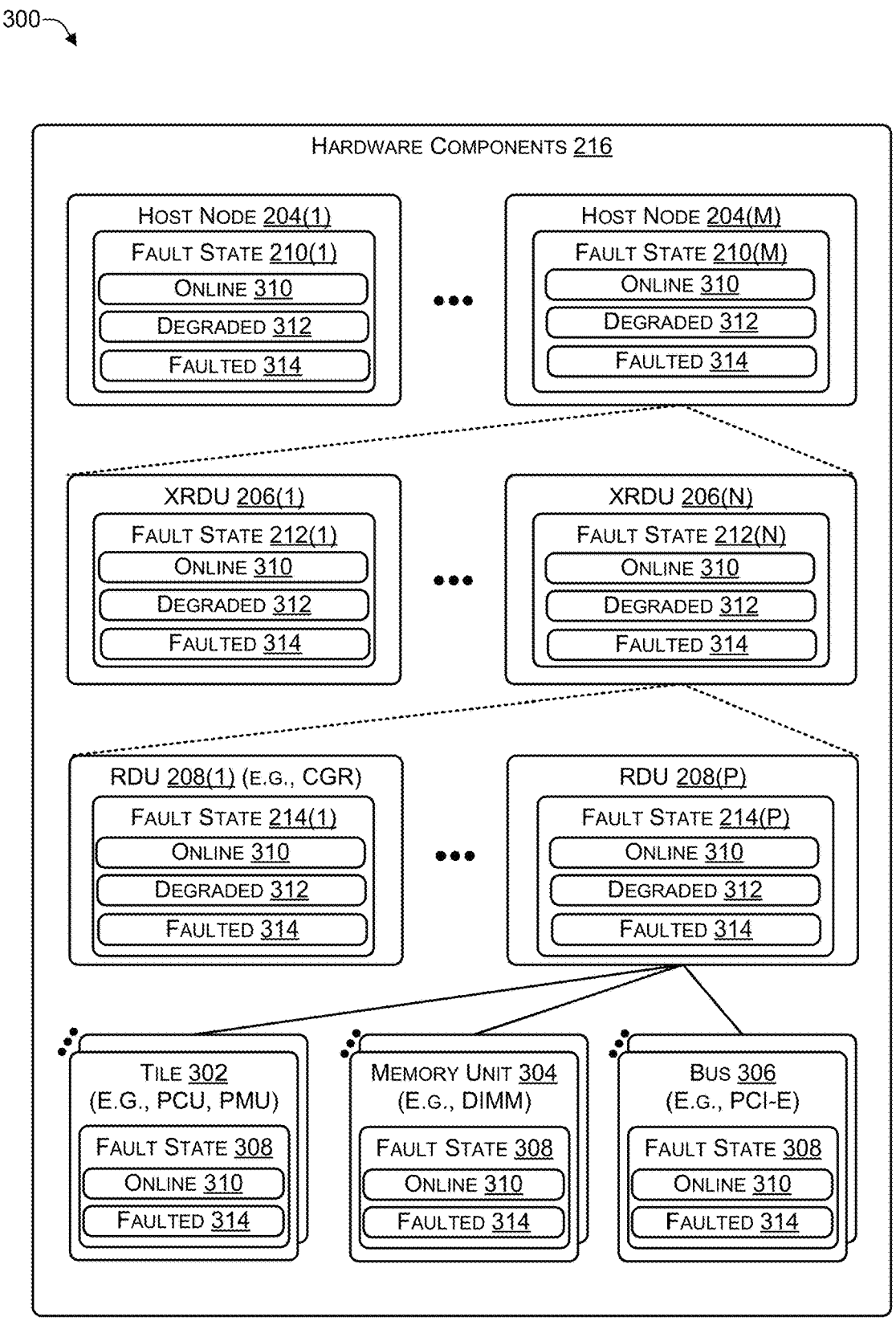
FIG. 3 illustrates a hardware component hierarchy that includes a fault state of individual hardware components, according to some embodiments.

FIG. 3 illustrates a hardware component hierarchy 300, according to some embodiments. The fault management system 218 of FIG. 2 may maintain a fault state machine for each type of component using the component data 202. Each RDU 208 includes multiple tiles 302 (e.g., the PMUs 108 and the PCUs 110 of FIG. 1) and multiple links 112 and may have access to multiple memory units 114.

A state transition in a particular component is passed to a higher-level component based on the hierarchical structure shown in FIG. 3. For example, if the state 214(P) of the RDU 208(P) changes from online 310 to faulted 314, then the state 212(N) of the XRDU 206(N) that includes the RDU 208(P) changes from online 310 to degraded 312 or from degraded 312 to faulted 314, based on the number of RDUs 208 that have issues. The state 210 represents the host node 204, the top most component in the hierarchy.

If a state 308 of a memory unit 114 accessible to one or more of the RDUs 208 changes from online 310 to faulted 314, then the corresponding state 214 of the RDU 208 that uses the memory unit 114 changes (e.g., from online 310 to degraded 312 or from degraded 312 to faulted 314, based on the total number of faulted components in the RDU 208). The state 308 of the tile 302 (e.g., the PMU 108 or the PCU 110 of FIG. 1) affects the state 214 of each RDU 208. For example, a PMU 108 or a PCU 110 that transitions from online to faulted or from online to degraded cases the state 214 of the RDU 208 to transition from online to degraded or from degraded to faulted. A DIMM transitioning to faulted may cause the state 214 of the RDU 208 to remain degraded because host memory can be used to run applications. With tiles (PMUs 108 or PCUs 110), when all tiles of an RDU 208 transition to faulted, the state 214(P) of the associated RDU 208 transitions to faulted.

If an uncorrectable error (UE) or repetitive correctable errors (CE) are reported at a memory address associated with the memory units 114, then the localized memory around the faulted address is marked unusable and the data stored in that location is relocated to a different memory segment. If one of the RDUs 208 is idle, the state 308 of the memory unit 114 transitions from online 310 to faulted 314, e.g., resulting in the corresponding DDR_CH and DIMM pair to transition to faulted. Double Data Rate (DDR) channels may be treated as pairs to reduce the interleave factor (e.g., from 6 to 4), which may cause DIMMs from other DDR channels to go offline.

The absent state of a particular component causes components (DIMMs, RDUs, and XRDUs) at a lower level in the hierarchy to have the same absent state. The absent state indicates that the component is physically not present or missing from the system topology due to some reason (other than non-functional). An RDU in the absent state is marked offline and cannot be in any other state. A tile (PMU or PCU) is either in an online state or a fault state and cannot be in any other state (e.g., cannot be degraded) because a tile cannot be partially functional. If a tile is in the fault state, then the corresponding RDU is in a degraded state. When a predetermined percentage of tiles (PMUs and PCUs) of a particular RDU (of the RDUs 208) are in the fault state, then the state 214 of the particular RDU 208 is transitioned to the fault state. For example, if 80% or more of the tiles are faulted then the RDU is transitioned to the fault state.

The PCIe link states are defined to be normal at a first threshold, such as when a particular number of lanes are operating at a particular bandwidth (e.g., <Gen4,x16>) and the state is Online. A link state below normal (e.g., below the first threshold) but above a second threshold (e.g., <Gen2, x16>) may be marked as Degraded. A link state below the second threshold may be marked as Faulted. When the state 308 of the link 112 transitions to faulted 314 then the state 214 of the RDU 208 transitions from online 310 to degraded 312. When the link state is degraded then the RDU state may remain online (if all the remaining components of the RDU are in the online state). When the link is faulted, an application that is using the PCIe link to communicate with other RDUs, then the resource manager 246 reroutes traffic between the RDUs through a different link.

Figure 4:
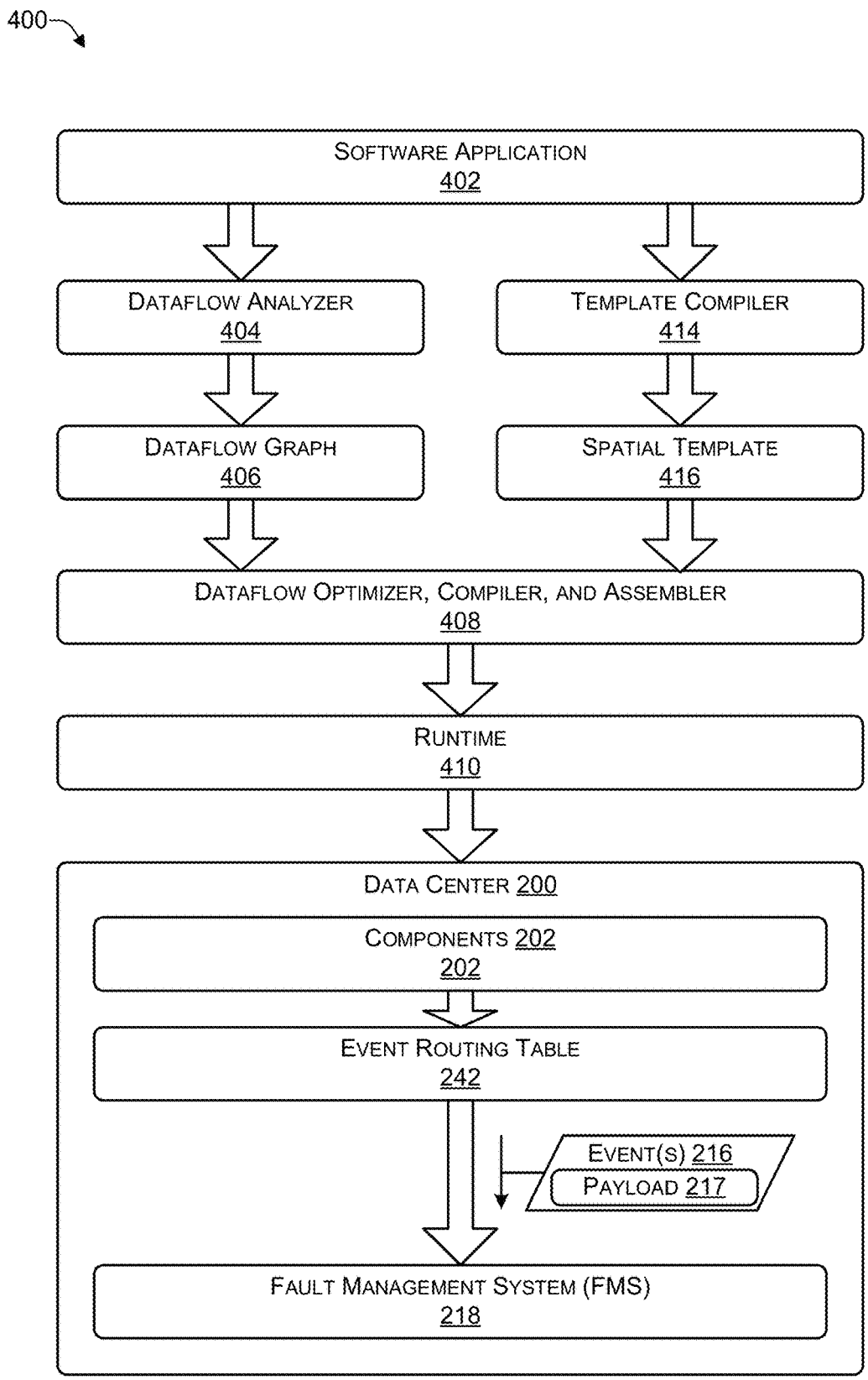
FIG. 4 illustrates an example of how a software application may be executed by components of a data center, according to some embodiments.

FIG. 4 illustrates an example 400 of how a software application may be executed by components of a data center, according to some embodiments. The software application 402 may be analyzed using a data flow analyzer 404 to produce a data flow graph 406 that indicates how data is predicted to flow during execution of the software application 402. For example, the data flow graph 406 may identify portions of the software application 402 that may be executed substantially in parallel and other portions that may be executed in series. A template compiler 414 and a spatial template 416 may use the spatial language programming language, a programming language to provide a configurable accelerator design language, to specify hierarchical parallel and pipelined data paths and explicit memory hierarchies.

A data flow optimizer, compiler, and assembler 408 may modify the data flow of the software application 402 based on the data flow graph 406 to create a modified data flow that is more efficiently executed by components of the data center 200. The resulting code may be compiled and assembled to create an executable file that is executed at runtime 410 by components of the data center 200. When one of the components 202 causes an event to occur, the event may be sent to the event routing table 242, which then routes the event to the fault management system 218.

Figure 5:
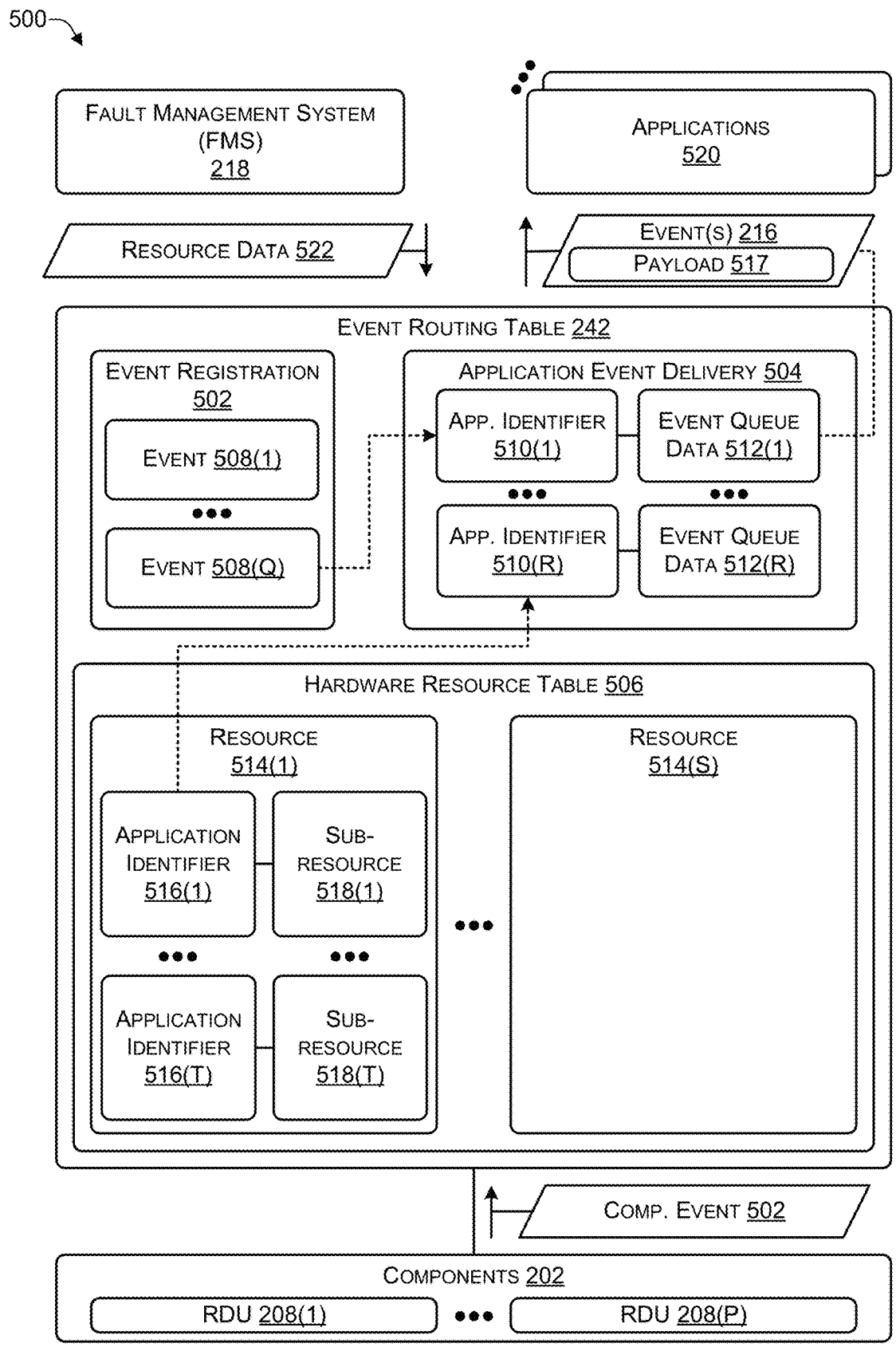
FIG. 5 illustrates an example of an event routing table, according to some embodiments.

FIG. 5 illustrates an example of an event routing table (e.g., the event routing table 242 of FIG. 2), according to some embodiments. The event routing table 242 receives one or more component events, such as a representative component event 502, from one of the components 202, creates the event 216 that includes the payload 217, and sends the event 216 to one or more software applications 520 that are being executed, the fault management system 218, or any combination thereof.

The event routing table 242 includes an event registration queue 502, an application event delivery table 504, and a hardware resource table 506. The event registration queue 502 identifies and enables access to a queue of multiple events 508(1) to 508(Q) (Q>0). The application event delivery table 504 includes a list of application identifiers 510(1) to 510(R) (R>0) corresponding to the applications 520 and associated event queue data 512(1) to 512(R). The software applications 520 corresponding to applications 510(1) to 510(R) include software applications that are using a portion of the components 202. The resource table 506 identifies the particular resources associated with each of the applications 520 that are being executed. The hardware resource table 506 identifies each hardware resource 514(1) to 514(S) (S>0) in the system. For each resource 514, the hardware resource table 506 includes an application identifier 516 and the associated sub-resources 518. For example, application identifier 516(1) may use a portion of resource 518(1), e.g., RDU 208(P). In some cases, each resource 514 may represent an RDU and the sub-resources 518 may represent components (e.g., tiles, PCIe links, memory, and the like) associated with each RDU. For example, sub-resource 518(1) may identify a portion of the PCUs 110 of each RDU, sub-resource 518(2) may identify a portion of the PMUs 108 of each RDU, and so on. In other cases, each of the resources 514 may identify a type of resource that is available. For example, resource 514(1) may identify PCUs 110 in the system, resource 514(2) may identify PMUs in the system, resource 514(3) may identify PCIe links 112 in the system, and so on. In this example, each sub-resource 518 may identify a portion of the resources. To illustrate, sub-resource 518(1) may identify a portion of the PCUs 110 and so on.

The components 202 may report events, such as a representative event 502, to the event routing table 242. More than one of the components 202 may report an event and therefore, in some cases, multiple events may be reported substantially simultaneously. Each component event (e.g., the component event 502) is routed, using the application identifier 516 associated with each application, to the particular application that is assigned a portion of the RDUs 208 that are part of the resources associated with the application identifier 516. For example, the sub-resources 518(T) may identify the portion of the RDUs 208 that are assigned to the application associated with the application identifier 516(T). The sub-resources 520 may include tiles (e.g., PCUs 110 and PMUs 108 of FIG. 1), direct memory access (DMA) channels 116, address generator units (AGUs) 104 and coalescing units (CUs) 102, memory 114, PCIe links 112 and the like.

The event routing table 242 is used to identify the resource 514 associated with the component event 502 and route the component event 502 to the application (one of the applications 520) associated with application identifier 510 (e.g., that is currently using the resource 514). For example, before executing, a particular application of the applications 520 is assigned to use sub-resources 520 and the particular application is registered to receive notifications of events associated with the sub-resources 520 that the particular application will use. The event routing table 242 is configured to dynamically route events, such as the component event 502, from one or more of the components 202 (e.g., at the RDU-level or at the tile-level) to the FMS 218 and to the particular application 520 that is using the resources 514.

The event registration table 502 is indexed by the event type 508. Each entry in the event registration table 502 identifies applications 512 that are registered for each event type 508. The hardware resource table 506 is indexed by an identifier 516 that is assigned to each type of hardware resource of the components 202 that is capable of generating an event. The resources 514 are allocated to the applications 520 with corresponding application identifiers 516 and the hardware resource table 506 is used to identify the application having the application identifier 516 where the event is to be sent (e.g., routed).

The application event delivery table 504 is indexed by a dynamically assigned application identifier 510 which is tracked by the event registration table 502. Each entry in the application event delivery table 504 includes details about the destination for each of the events 508, e.g., each application's event queue 514 into which events are to be delivered.

Before an application (e.g., one of the applications 520) begins executing, a runtime component (e.g., operating system, compiler, or the like) may assign a set of resources (e.g., a portion of the components 202) to the application for the application to use when executing. The application provides resource data 522 to the event routing table 242 indicating (1) the particular resources 514 that the application has been assigned (e.g., will be using when executing) and (2) the particular events 508 associated with the particular resources 514, whose occurrence causes the event routing tables 242 to notify the application (e.g., by placing the event 508 in an event queue identified by the event queue data 512, where the event queue is associated with the application).

When an event (e.g., component event 502) occurs and is received by the event routing table 242, the resource(s) 514 associated with the component event 502 is identified using the hardware resource table 506 and the application identifier 516 of the application that is currently assigned to use the resources 514 is determined. The event type of the event 508 is used to determine whether the application is to be notified that the event 502 occurred. If the application has requested to be notified that the event 508 occurred, then the application identifier 516 in the hardware resource table 506 is used to lookup the application based on the application identifier 516 and the associated event queue data 512 in the application event delivery table 504 and the event 502 is placed in the event queue associated with the application. The event queue associated with the application is accessed using the event queue data 512 (e.g., a pointer) in the application event delivery table 504.

Figure 6:
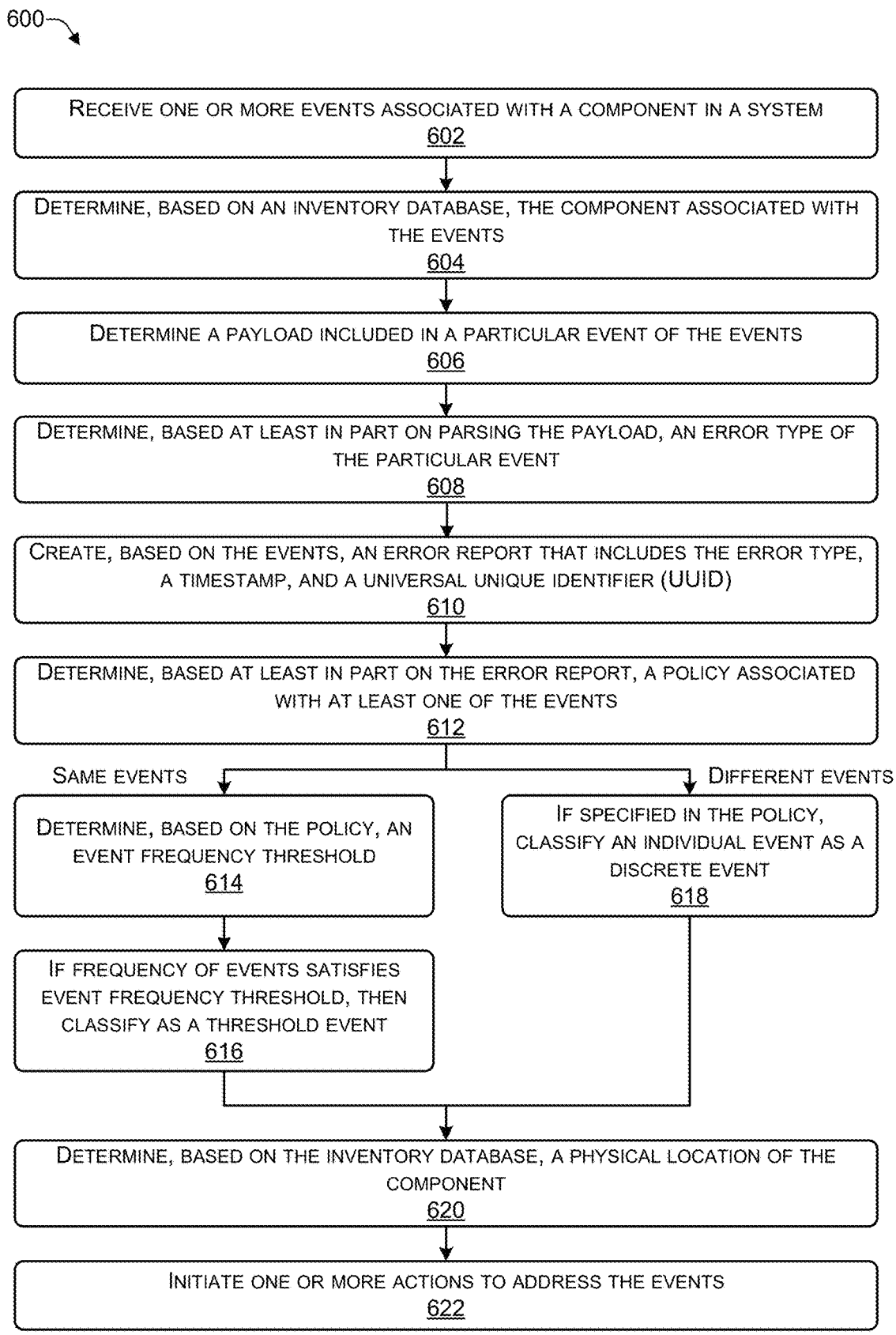
FIG. 6 illustrates an example of a process that includes classifying one or more events as either a threshold event or a discrete event, according to some embodiments.
Figure 7:
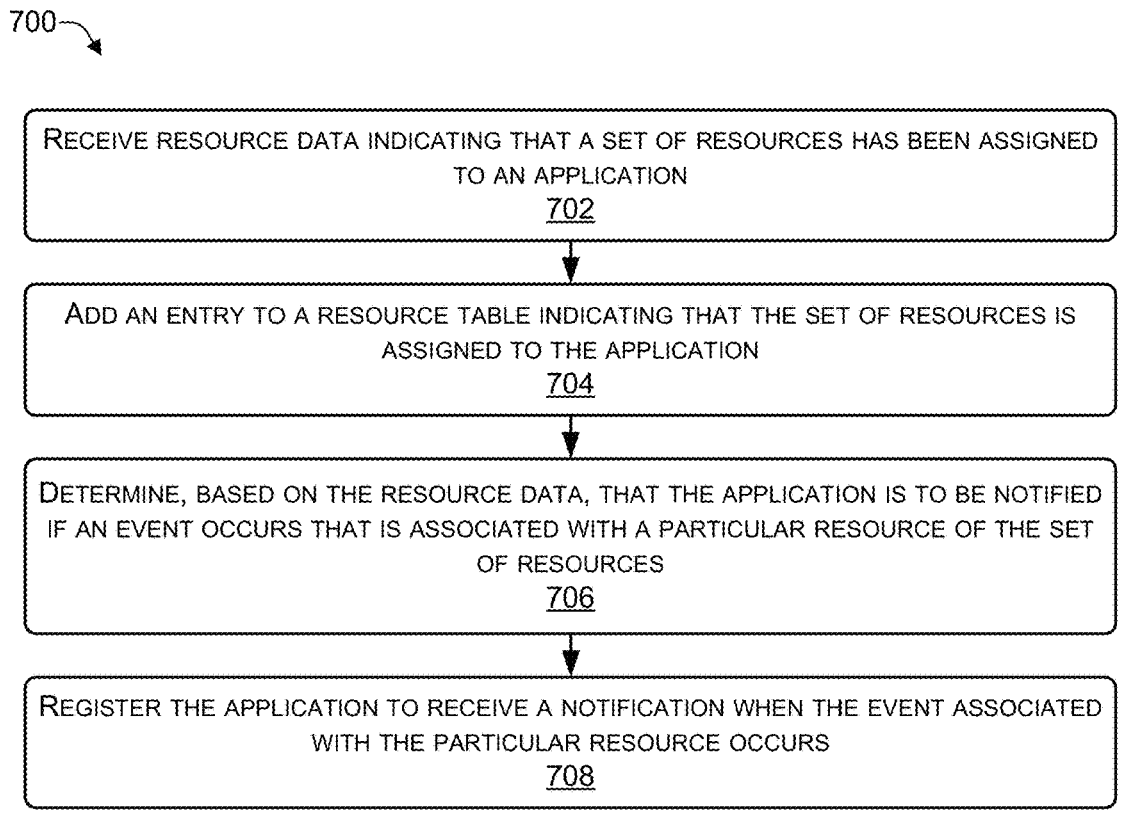
FIG. 7 illustrates an example of a process that includes registering an application to receive a notification when an event associated with a particular resource occurs, according to some embodiments.
Figure 8:
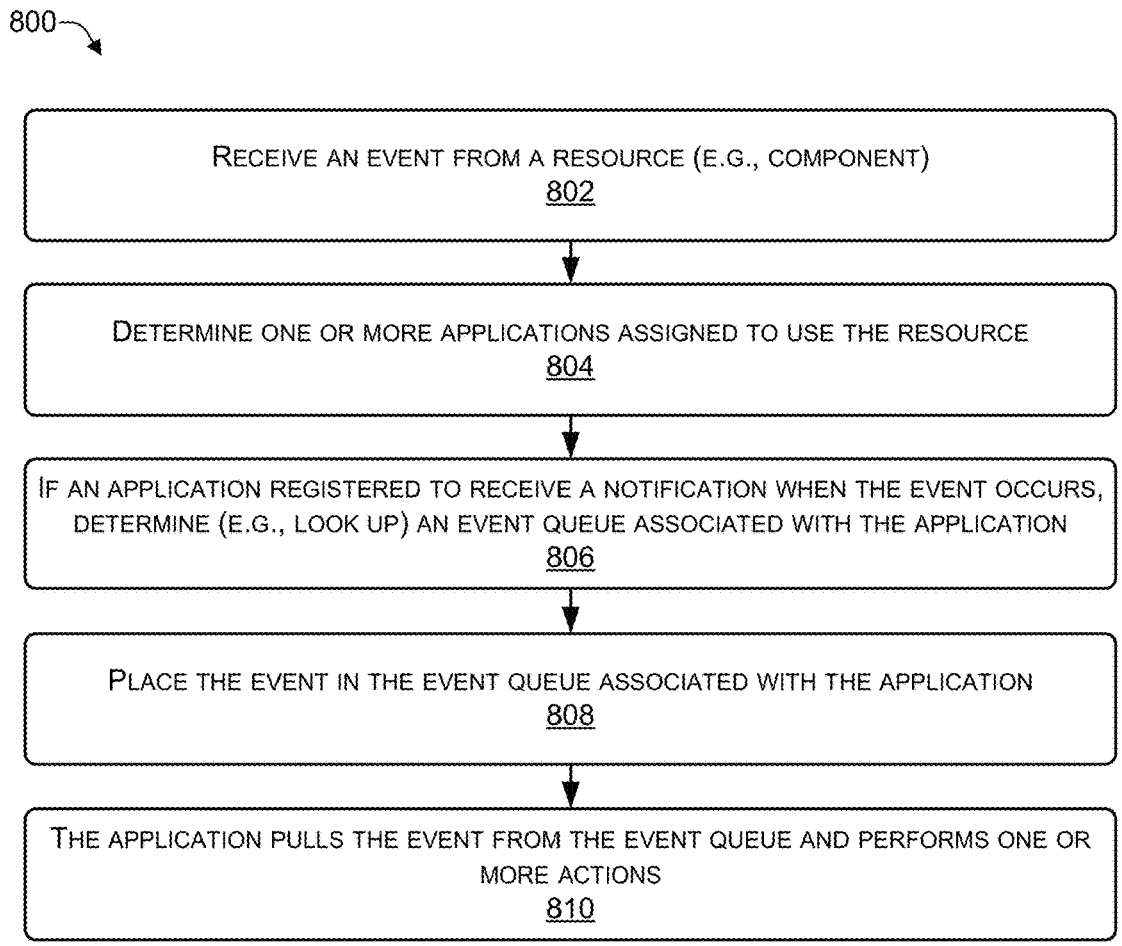
FIG. 8 illustrates an example of a process that includes placing an event in an event queue associated with an application, according to some embodiments.

In the flow diagrams of FIGS. 6, 7, and 8 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, and 800 are described with reference to FIGS. 1, 2, 3, 4, and 5 as described above, although other models, frameworks, systems and environments may be used to implement these processes.

FIG. 6 illustrates an example of a process 600 that includes classifying one or more events as either a threshold event or a discrete event, according to some embodiments. The process 600 may be performed by the fault management system 218 of FIGS. 2, 4, and 5.

At 602, the process may receive one or more events ("events") associated with a component in a system. At 604, the process may determine, based on an inventory database, the component associated with the events. For example, in FIG. 2, the fault management system 218 may receive the events 216. The fault management system 218 may use the inventory database 232 to determine the component (of the components 202) that generated the events 216.

At 606, the process may determine a payload included in a particular event of the events. At 608, the process may determine, based at least in part on parsing the payload, an error type of the particular event. At 610, the process may create, based on the events, an error report that includes the error type, a timestamp, and a UUID. For example, in FIG. 2, the fault management system 218 may determine the payload 217 associated with the events 216 and parse the payload 217. Based on parsing the payload 217, the fault management system 218 may determine an error type 223 associated with the event 216. The fault management system 218 may create the error report 221 that includes the error type 223, a unique universal identifier (UUID), and a timestamp identifying (1) when the events 216 were received by the fault management system 218, (2) when the events 216 were generated by the component, or (3) both.

At 612, the process may determine, based at least in part on the error report, a policy associated with at least one of the events. If the events are the same (or similar), then the process determines, at 614, an event frequency threshold (e.g., based on the policy). At 616, if the process determines that the frequency at which the events occurred satisfies the event frequency threshold (e.g., specified in the policy), then the process may classify the events as a threshold event. If the process determines that the events are not the same (e.g., different events), then the process determines whether a particular one of the events is specified in the policy. If the policy specifies that an individual event is sufficiently severe, then the process classifies the individual event as a discrete event resulting in the associated component being faulted. For example, in FIG. 1, the fault management system 218 may determine a policy in the policy database 234 associated with the error report 221 and identify an event frequency threshold (e.g., a number of occurrences within a predetermined time interval) specified in the policy. If the fault management system 218 determines that the events 216 satisfy the event frequency threshold (e.g., at least N number of events occurred within a specified time interval), then the fault management system 218 may classify the events 216 as a threshold event. If the fault management system 218 determines that a particular event of the events 216 is specified in the policy as being severe enough to be a discrete event, then the fault management system 218 may classify the particular event of the events 216 as a discrete event resulting in the associated component being faulted.

At 620, the process may determine, based on the inventory database, a physical location of the component. At 622, the process may initiate one or more actions to address the events. For example, in FIG. 2, the fault management system 218 may use the inventory database 232 to determine a physical location of the component that sent the events 216 and initiate one or more actions to address the events 216. For example, the actions may include modifying a fault state of a particular component and components that are higher in the hierarchy that include the particular component, as described in FIG. 3. For example, the fault state may be changed from online to degraded or from degraded to faulted. The actions may include notifying a runtime operating system to route workloads away from particular components (e.g., components that generated the events 216). The actions may include instructing a technician to replace or repair particular hardware components.

Thus, a fault management system may receive one or more events indicating something that has occurred in a system. The fault management system may determine the component that generated the events, determine an error type of one or more of the events, and create an error report associated with the events. Based on the error report, the fault management system may identify a policy and use the policy to classify the events as a threshold event or as a discrete event. The fault management system may perform one or more actions to address the events.

FIG. 7 illustrates an example of a process 700 that includes registering an application to receive a notification when an event associated with a particular resource occurs, according to some embodiments. The process 700 may be performed by the event routing table 242 of FIGS. 2, 4, and 5.

At 702, the process may receive resource data indicating that a set of resources has been assigned to an application. At 704, the process may add an entry to a table indicating that the set of resources has been assigned to the application. At 706, the process may receive a request from the application (and, in some cases, the FMS 218) to be notified if an event occurs that is associated with the particular resource of the set of resources. At 708, the process may register the application (and the FMS 218) to receive a notification when the event associated with the particular resource occurs (for example, the process may notify the application by placing an event in an event queue of the application). For example, in FIG. 5, the event routing table 242 may receive the resource data 522 from one of the applications 520. The resource data 522 may indicate that the application has been assigned a set of resources and indicate for which events the application is to be notified. The event routing table 242 may add an entry to the hardware resource table 506 indicating which resources and/or sub-resources have been assigned to the application. The event routing table 242 may update the event registration table 502 to indicate that the application is to be notified when the specified events occur.

FIG. 8 illustrates an example of a process 800 that includes placing an event in an event queue associated with an application, according to some embodiments. The process 800 may be performed by the event routing table 242 of FIGS. 2, 4, and 5.

At 802, the process may receive an event from a resource (e.g., a component in a system). At 804, the process may determine one or more applications assigned to use the resource. At 806, if the process determines that an application registered to receive a notification when the event occurs, then the process may determine (e.g., look up in a table) a pointer to the event queue associated with the application. At 808, the process may place the event in the event queue associated with the application. At 810, the application may pull the event from the event queue and perform one or more actions (e.g., sending an error event to a fault management system). For example, in FIG. 5, the event routing table 242 may receive the component event 502 from a resource such as one of the components 202. The event routing table 242 may determine applications associated with the application identifiers 516 assigned to use the resources 514 and the sub-resources 518. If the event routing table 242 determines that the event registration 502 indicates that the application (or the FMS 218) is to be notified when the event occurs, then the event routing table 242 may determine the event queue data 512 using the application identifier 510 and use the event queue data 512 to access an event queue associated with the application identified by the application identifier 510 and place the event notification in the event queue.

Thus, a fault management system may receive one or more events associated with a component. For example, a service executing on a host node may send the one or more events associated with components included in the host node. The fault management system may examine a payload of individual events and use an inventory database to identify the component(s) associated with the event. The fault management system may create a report based on the payload and a type of the event. The report may include a unique universal identifier (UUID) and the timestamp indicating when the event was received by the fault management system. The fault management system may determine a policy (retrieved from a policy database) associated with the event based on the event type. The policy may indicate how to classify the event. For example, if a particular event (or a particular type of event) occurs at a threshold frequency (e.g., a particular number of times within a particular period of time), then the particular event may be classified as a threshold event. If the particular event is defined by the policy as being sufficiently severe, then the particular event may be classified as a discrete event that results in the associated component being faulted. The policy associated with the event(s) may indicate one or more corrective actions to be performed to isolate and/or recover from the event. For example, one or more of the components may be isolated (e.g., taken out of service), restarted/reinitialized, and then brought back into service (e.g., online). In some cases, the fault management system may perform one or more tests to determine status of the component and whether the component can be brought back into service. If the fault management system determines that the component has failed and cannot be brought back into service, then the fault management system may raise an alert indicating that the component is to be physically repaired or replaced.

Although the description has been described with respect to particular examples thereof, these particular examples are merely illustrative, and not restrictive. The description may reference specific systems and techniques, and does not intend to limit the technology to the specifically disclosed systems and techniques. The technology may be practiced using other features, elements, systems, and techniques. The examples are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular examples thereof, these particular examples are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. The systems and techniques may be included in a single chip or in a multi-chip module (MCM) packaging multiple semiconductor dies in a single package. All such variations and modifications are to be considered within the ambit of the present disclosed technology the nature of which is to be determined from the foregoing description.

The disclosed technology can be practiced as a system, method, or article of manufacture. One or more features of an example can be combined with the base examples. Examples that are not mutually exclusive are taught to be combinable. One or more features of an example can be combined with other examples. This disclosure periodically reminds the user of these options. Omission from some examples of recitations that repeat these options should not be taken as limiting the combinations taught in the preceding sections—these recitations are hereby incorporated forward by reference into each of the following examples.

The systems and techniques described herein can be implemented in the form of a computer product, including a non-transitory computer-readable storage medium with computer usable program code for performing any indicated method steps and/or any configuration file for one or more RDUs to execute a high-level program. Furthermore, one or more examples of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more examples of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of an RDU; or (iv) a combination of aforementioned items.

The clauses described in this section can be combined as features. In the interest of conciseness, the combinations of features are not individually enumerated and are not repeated with each base set of features. Features identified in the clauses described in this section can readily be combined with sets of base features identified as examples in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other examples of the clauses described in this section can include a non-transitory computer readable storage medium storing instructions executable by a processor to perform any of the clauses described in this section and/or bit files for configuration of an RDU to perform any of the technology described herein. Yet another example of the clauses described in this section can include a system including memory and one or more processors operable to execute instructions, stored in the memory, to perform any of the clauses described in this section.

Any suitable technology for manufacturing electronic devices can be used to implement the circuits of particular examples, including CMOS, FinFET, BiCMOS, bipolar, JFET, MOS, NMOS, PMOS, HBT, MESFET, etc. Different semiconductor materials can be employed, such as silicon Si, germanium Ge, SiGe, GaAs, InP, GaN, SiC, graphene, etc. Although the physical processing of signals may be presented in a specific order, this order may be changed in different particular examples. In some particular examples, multiple elements, devices, or circuits shown as sequential in this specification can be operating in parallel.

Particular examples may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular examples can be achieved by any means as is known in the art.

It will also be appreciated that one or more of the elements depicted in the drawings/figures can also be implemented in a more separated or integrated manner, or even removed or rendered as inoperable in certain cases, as is useful in accordance with a particular application.

Thus, while particular examples have been described herein, latitudes of modification, various changes, and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit of the technology disclosed.

What is claimed is:

1. A method comprising:
   receiving, by one or more coarse grained reconfigurable processors, one or more fault events associated with a reconfigurable data flow unit (RDU) component in a system;
   determining, by the one or more coarse grained reconfigurable processors and based on an inventory database, a component included in the RDU component that is associated with the one or more fault events;
   creating, by the one or more coarse grained reconfigurable processors and based at least in part on the one or more fault events, an error report, the error report comprising:
   an error type identifying a type of error associated with the one or more fault events;
   a timestamp indicating when the error report was created; and
   a universal unique identifier (UUID) to uniquely identify the error report;
   determining, by the one or more coarse grained reconfigurable processors and based at least in part on the error report, a policy associated with the one or more fault events;
   classifying, by the one or more coarse grained reconfigurable processors and based at least in part on the policy, the one or more fault events as either a threshold event or a discrete event; and
   performing, by the one or more coarse grained reconfigurable processors, one or more actions to address the one or more fault events; and
   notifying an application operated by the RDU of occurrence of the one or more fault events, the classification of the one or more fault events, and the actions taken performed to address the one or more fault events.

2. The method of claim 1, wherein the RDU includes component comprises at least one of:
   a reconfigurable dataflow unit (RDU);
   a pattern compute unit (PCU) included in the RDU;
   a pattern memory unit (PMU) included in the RDU;
   a data link included in the RDU; or; and
   a channel to access memory, the channel included in the RDU.

3. The method of claim 1, further comprising:
   determining a payload included in a particular fault event of the one or more fault events;
   parsing the payload; and
   determining, based at least in part on parsing the payload, the error type of the particular fault event.

4. The method of claim 1, further comprising:
   determining, based on the inventory database, a physical location of the RDU component.

5. The method of claim 1, wherein classifying, based at least in part on the policy, the one or more fault events as either the threshold event or the discrete event comprises:
   based at least in part on determining that a particular fault event of the one or more fault events is specified in the policy as being the discrete event, classifying the particular event as the discrete event; and
   based at least in part on determining that the one or more fault events occurred in a time interval that satisfies an fault event frequency threshold specified in the policy, classifying the one or more fault events as the threshold event.

6. The method of claim 1, wherein performing the one or more actions to address the one or more fault events comprises:
   isolating the RDU component by changing a status of the RDU component to an offline status;

initiating a reinitialization of the RDU component; and
based at least in part on determining that reinitialization of the RDU component solved an issue that is causing the one or more fault events, changing the status of the RDU component to an online status.

7. The method of claim 1, wherein performing the one or more actions to address the one or more fault events comprises:
   isolating the RDU component by changing a status of the RDU component to an offline status;
   sending a reinitialization instruction to the RDU component to cause the RDU component to reinitialize; and
   based at least in part on determining that reinitialization of the RDU component failed to solve an issue that is causing the one or more fault events, keeping the status of the RDU component at the offline status.

8. A fault management system, executed by one or more coarse grained reconfigurable processors, to perform operations comprising:
   receiving one or more fault events associated with a reconfigurable data flow unit (RDU) component being monitored by the fault management system;
   determining, based on an inventory database, a component included in the RDU component that is associated with the one or more fault events;
   creating, based at least in part on the one or more fault events, an error report, the error report comprising:
   an error type identifying a type of error associated with the one or more fault events;
   a timestamp indicating when the error report was created; and
   a universal unique identifier (UUID) to uniquely identify the error report;
   determining, based at least in part on the error report, a policy associated with the one or more fault events;
   classifying, based at least in part on the policy, the one or more fault events as either a threshold event or a discrete event; and
   performing one or more actions to address the one or more fault events; and
   notifying an application operated by the RDU of occurrence of the one or more fault events, the classification of the one or more fault events, and the actions performed to address the one or more fault events.

9. The fault management system of claim 8, wherein the RDU component includes comprises at least one of:
   a particular reconfigurable dataflow unit (RDU);
   a pattern compute unit (PCU) included in the RDU;
   a pattern memory unit (PMU) included in the RDU;
   a data link included in the RDU;
   a channel to access memory, included in the RDU; er; and
   any combination thereof.

10. The fault management system of claim 8, further comprising:
   determining a payload included in a particular fault event of the one or more fault events;
   parsing the payload; and
   determining, based at least in part on the payload, the error type of the particular fault event.

11. The fault management system of claim 8, further comprising:
   determining, based on the inventory database, a physical location of the RDU component.

12. The fault management system of claim 8, wherein classifying, based at least in part on the policy, the one or more fault events as either the threshold event or the discrete event comprises:
   based at least in part on determining that a particular event of the one or more fault events is specified in the policy as being the discrete event, classifying the particular event as the discrete event; and
   based at least in part on determining that the one or more fault events occurred in a time interval that satisfies an fault event frequency threshold specified in the policy, classifying the one or more fault events as the threshold event.

13. The fault management system of claim 8, wherein performing the one or more actions to address the one or more fault events comprises:
   isolating the RDU component by changing a status of the RDU component to an offline status;
   initiating a reinitialization of the RDU component; and
   based at least in part on determining that reinitialization of the RDU component solved an issue that is causing the one or more fault events, changing the status of the RDU component to an online status.

14. The fault management system of claim 8, wherein performing the one or more actions to address the one or more fault events comprises:
   isolating the RDU component by changing a status of the RDU component to an offline status;
   sending a reinitialization instruction to the RDU component to cause the RDU component to reinitialize; and
   based at least in part on determining that reinitialization of the RDU component failed to solve an issue that is causing the one or more fault events, keeping the status of the RDU component at the offline status.

15. A method comprising:
   before an application begins executing:
   receiving, by one or more coarse grained reconfigurable processors, resource data from the application;
   determining, by the one or more coarse grained reconfigurable processors and based on the resource data, a set of resources assigned to the application;
   adding, by the one or more coarse grained reconfigurable processors, an entry to a resource table indicating that the set of resources has been assigned to the application;
   determining, by the one or more coarse grained reconfigurable processors and based on the resource data, an event associated with a particular resource of the set of resources; and
   registering, by the one or more coarse grained reconfigurable processors, the application to receive a notification of an occurrence of the event associated with the particular resource of the set of resources;
   after the application begins executing:
   receiving, by the one or more coarse grained reconfigurable processors, an event notification indicating the occurrence of the event;
   determining, by the one or more coarse grained reconfigurable processors, that the event is associated with the particular resource of the set of resources; and
   providing a notification to the application of the occurrence of the event associated with the particular resource.

16. The method of claim 15, wherein the set of resources comprises a reconfigurable dataflow unit (RDU), wherein the RDU includes at least one of:
   a reconfigurable dataflow unit (RDU);
   a pattern compute unit (PCU) included in the RDU;
   a pattern memory unit (PMU) included in the RDU;
   a data link included in the RDU;

a channel to access memory; and, the channel included in the RDU; or any combination thereof.

17. The method of claim 15, further comprising:

including an error type of the event as a payload of the notification to the application.

18. The method of claim 15, wherein providing the notification to the application of the occurrence of the event associated with the particular resource comprises:

determining, using an event delivery table, a pointer to an event queue associated with the application; and adding the notification of the occurrence of the event to the event queue associated with the application.

19. The method of claim 15, wherein the application comprises:

a software application that is being executed by the one or more coarse grained reconfigurable processors; or a fault management system.

20. The method of claim 15, wherein determining that the event is associated with the particular resource of the set of resources comprises:

determining, using the resource table, that the set of resources is assigned to the application; and determining that the particular resource is included in the set of resources assigned to the application.

* * * * *